United States Patent [19]

Moyer et al.

[11] Patent Number: 5,029,072
[45] Date of Patent: Jul. 2, 1991

[54] LOCK WARNING MECHANISM FOR A CACHE

[75] Inventors: William C. Moyer; Ralph McGarity, both of Austin; James G. Gay, Pflugerville; Jesse R. Wilson, Austin, all of

[73] Assignee: Motorola, Inc., Schaumburg, Ill.

[21] Appl. No.: 144,638

[22] Filed: Jan. 11, 1988

Related U.S. Application Data

[63] Continuation of Ser. No. 812,566, Dec. 23, 1985, abandoned.

[51] Int. Cl.$^5$ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,084,226 | 4/1978 | Anderson et al. | 364/200 |
| 4,093,986 | 6/1978 | Bodner et al. | 364/200 |
| 4,190,885 | 2/1980 | Joyce et al. | 364/200 |
| 4,197,580 | 4/1980 | Chang et al. | 364/200 |
| 4,264,953 | 4/1981 | Douglas et al. | 364/200 |
| 4,287,561 | 9/1981 | Liptay | 364/200 |
| 4,332,010 | 5/1982 | Messina et al. | 364/200 |
| 4,370,710 | 1/1983 | Kroft | 364/200 |
| 4,464,712 | 8/1984 | Fletcher | 364/200 |
| 4,488,256 | 12/1984 | Zolnowsky et al. | 364/900 |
| 4,513,367 | 4/1985 | Chan et al. | 364/200 |
| 4,538,241 | 8/1985 | Levin et al. | 364/900 |
| 4,589,092 | 5/1986 | Matick | 364/900 |
| 4,638,426 | 1/1987 | Chang et al. | 364/200 |
| 4,727,485 | 2/1988 | Keshlear et al. | 364/200 |

Primary Examiner—Andrew J. James
Assistant Examiner—Viet Q. Nguyen

[57] ABSTRACT

In a data processing system, a paged memory management unit (PMMU) translates logical addresses provided by a processor to physical addresses in a memory using translators constructed using translation tables in the memory. The PMMU maintains a set of recently used translators in a translator cache. In response to a particular lock value contained in the translation tables in association with the translation descriptor for a particular page, the PMMU sets a lock indicator in the translator cache associated with the corresponding translator, to preclude replacement of this translator in the translator cache. A lock warning mechanism provides a lock warning signal whenever all but a predetermined number of the translators in the cache are locked. In response, the PMMU can warn the processor that the translator cache is in danger of becoming full of locked translators. Preferably, the PMMU is also inhibited from locking the last translator in the cache.

4 Claims, 1 Drawing Sheet

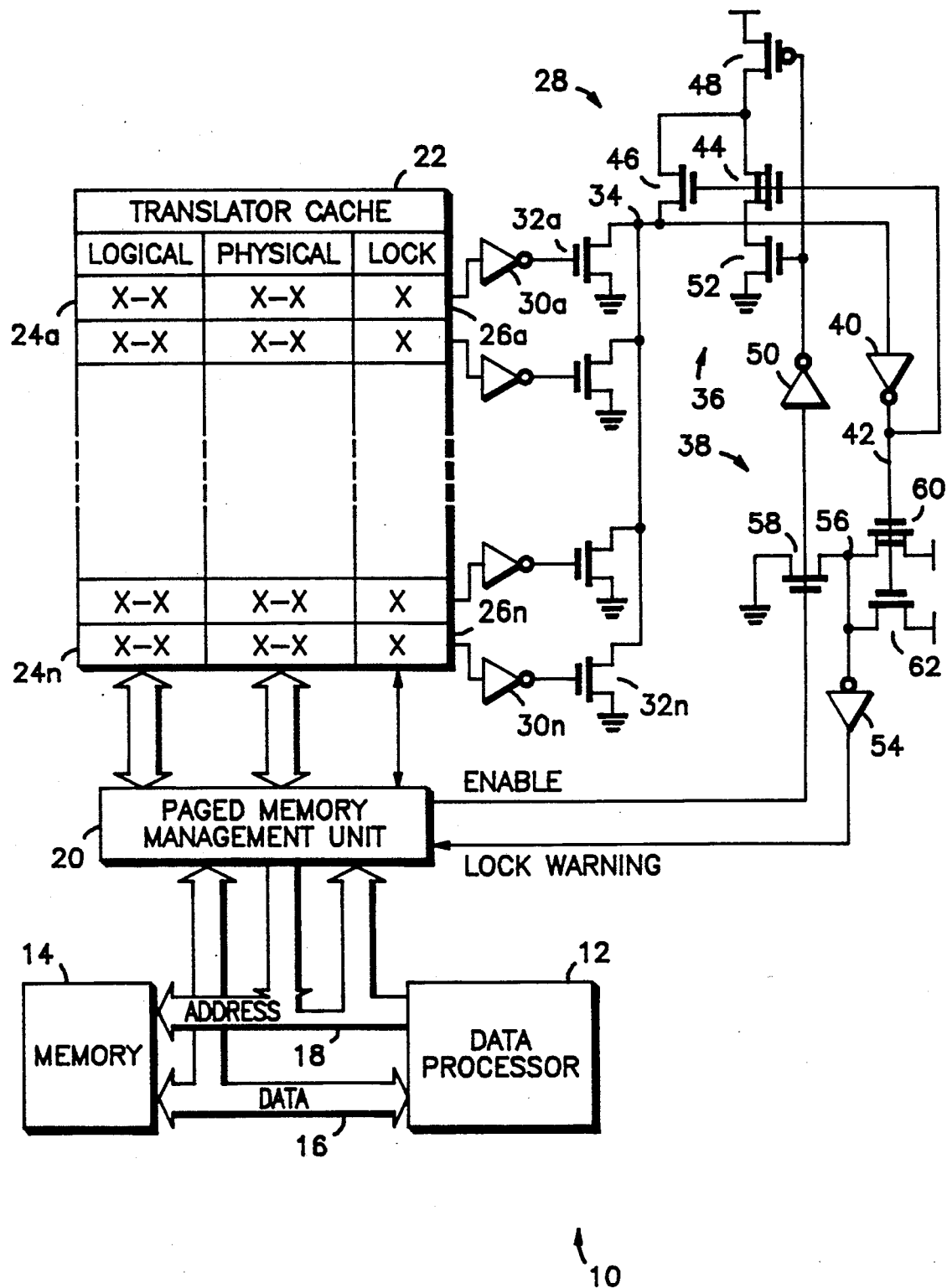

LOCK WARNING MECHANISM FOR A CACHE

This application is a continuation of application Ser. No. 812,566, filed Dec. 23, 1985, now abandoned.

CROSS REFERENCE TO RELATED APPLICATIONS

Related subject matter is disclosed in the following copending applications, all of which are assigned to the same Assignee as the subject invention:

1. U.S. application Ser. No. 718,753 entitled PAGED MEMORY MANAGEMENT UNIT HAVING VARIABLE NUMBER OF TRANSLATION TABLE LEVELS, invented by William Mall Keshlear, William C. Moyer and John Zolnowsky, filed Apr. 1, 1985;

2. U.S. application Ser. No. 718,669 entitled PAGED MEMORY MANAGEMENT UNIT HAVING VARIABLE SIZED TRANSLATION TABLES, invented by William C. Moyer, John Zolnowsky and William Mall Keshlear, filed Apr. 1 1985;

3. U.S. application Ser. No. 718,608 entitled PAGED MEMORY MANAGEMENT UNIT HAVING SELECTED TRANSLATION TABLE INDEXES, invented by Michael W. Cruess, William Mall Keshlear and John Zolnowsky, filed Apr. 1, 1985.

BACKGROUND OF THE INVENTION

In certain applications, such as the management of the memory of a data processing system, a cache is utilized to maintain associated information which has different periods of utility. For example, in the paged memory management unit (PMMU) described in the several copending applications cited above, logical-to-physical address translators are maintained in a translator cache. Often, it is desired to assure rapid access to certain code/data pages. This in turn requires that the translators for these pages be available in the cache for the required period of time. One solution has been to associate with each translator in the cache a lock indicator which, when set, will preclude removal of the translator in order to make room for a different translator. When a given page is no longer needed, the PMMU can be instructed by the processor to reset the lock indicator for the translator for that page, thereby making this translator a candidate for replacement.

In some circumstances, the processing activity may be such that the cache becomes full of locked translators. In this event, the PMMU will be unable to enter any new translators into the cache. As a result, the PMMU will be effectively prevented from performing any translations for which the translator is not already in the cache. One solution to this problem is for the PMMU to interrupt the processor as soon as the last entry is locked, so that the processor can immediately take remedial action. This may be acceptable in systems wherein the memory management routines of the operating system are always accessible (e.g. because the associated translators are among those locked in the cache). An example of such a system is shown in U.S. Pat. No. 4,084,226. In general, however, this solution is inherently risky, and requires either independent means to access the memory management routines, dedication of a portion of the cache to the essential translators, or some other emergency relief mechanism.

SUMMARY OF THE INVENTION

Accordingly, it is an object of the present invention to provide a mechanism which provides a warning signal when all but a predetermined number of entries in the cache are locked.

Another object of the present invention is to provide a mechanism which prevents the last entry in the cache from being locked even if the entry would otherwise be locked.

In carrying out these and other objects of the present invention, there is provided, in one form, a circuit for use with a cache comprising a plurality of storage locations for storing operands, each storage location having an associated lock indicator adapted to be selectively set and reset; and control logic for storing an operand in a selected one of the storage locations only if the associated lock indicator is reset, the control logic setting the lock indicator in response to a lock signal associated with the stored operand, and resetting the lock indicator of a particular storage location in response to a signal indicating that that storage location is to be unlocked. In accordance with the present invention, the circuit includes lock warning logic, coupled to the lock indicators of all of the storage locations, for providing a lock warning signal when all but a predetermined number of the lock indicators is set. In the preferred form, the control logic is inhibited by the lock warning signal from setting the lock indicator associated with a storage location even if the operand being stored therein has the lock signal associated therewith.

BRIEF DESCRIPTION OF THE DRAWINGS

The sole FIGURE is a schematic diagram of a lock warning circuit constructed in accordance with the present invention.

DETAILED DESCRIPTION OF THE INVENTION

Shown in the FIGURE is a data processing system 10 comprising a data processor 12 and a memory 14 coupled thereto via data and address busses 16 and 18, respectively. A paged memory management unit (PMMU) 20 translates a logical portion of the address provided by the processor 12 to the memory 14 via the address bus 18 into a corresponding portion of the physical address. Associated with the PMMU 20 is a translator cache 22 comprising a plurality of storage locations 24a-24n, each of which has an associated lock indicator 26a-26n, respectively. In response to each logical address provided by the processor 12, the PMMU 20 searches the translator cache 22 for a corresponding logical-to-physical translator. If none is found, the processor 12 is directed to abort the access cycle and release the buses 16-18 so that the PMMU 20 can access a set of translation tables stored in the memory 14 to determine the proper logical-to-physical address translator to enter in the translator cache 22. Subsequently, when the processor 12 restarts the aborted access cycle, the PMMU 20 will use the new translator in the translator cache 22 to determine the proper physical address to forward to the memory 14. Thereafter, whenever the processor 12 again accesses a logical address in the same logical page, the PMMU 20 will reuse the translator in the translator cache 22.

If, due to the processing activity of the processor 12, all of the storage locations 24a-24n in the translator cache 22 become full, the PMMU 20 must use a suitable replacement algorithm to determine which existing translator to replace with the new translator. In order to prevent certain translators from being considered candidates for this replacement algorithm, the respective translation descriptor in the translation tables stored in the memory 14 contains a lock field. If, when the PMMU 20 uses a particular translation descriptor to build a translator for entry into the translator cache 22, this lock field contains a "lock" value, the PMMU 20 will set the lock bit 26x of the storage location 24x selected to store the corresponding translator. So long as a particular lock bit 26x is set, the corresponding storage location 24x will not be a candidate for the replacement algorithm.

In order to detect when the translator cache 22 is in danger of filling up with locked translators, a lock warning circuit 28 is coupled to each of the lock bits 26a-26n, via corresponding inverting buffers 30a-30n and pull-down transistors 32a-32n wire ORed to a node 34. In general, if the voltage on the node 34 rises above a certain level because all but one (1) of the lock bits 26a-26n are set, a self-biasing sense amplifier 36 will provide a LOCK WARNING signal to the PMMU 20 via a level shifter 38. In the illustrated form, the sense amplifier 36 is comprised of a CMOS inverter 40, the input of which is coupled to node 34 and the output of which is coupled to a node 42, and a pair of n-channel transistors 44 and 46 which source current to node 34 at a rate dependent upon the voltage on node 42. Transistor 44 operates in the depletion mode to source a trickle current to the node 34 while transistor 46 sources current to the node 34 at a rate substantially proportional to the voltage on node 42. Current for the transistors 44 and 46 is provided by a p-channel transistor 48 in response to an ENABLE signal provided by the PMMU 20 via an inverter 50. In the absense of the ENABLE signal, transistor 48 will source no current while an n-channel transistor 52 sinks current from the node 34 so that the voltage on the node 34 is pulled below the switch point of inverter 40. In the preferred embodiment, transistor 46 is sized to source substantially the same amount of current as one (1) of the transistors 32a-32n can sink, so that transistors 44 and 46 together can maintain the voltage on the node 34 above the switch point of inverter 40 so long as only one (1) of the pull-down transistors 32a-32n is turned on by the corresponding lock bit 26a-26n being reset. However, whenever two (2) or more of the lock bits 26a-26n are reset, transistors 44 and 46 will be overpowered by the sum of the active pull-down transistors 32a-32n, and the voltage on the node 34 will drop below the switch point of inverter 40. Thus, the voltage on node 42 will vary depending upon how many of the lock bits 26a-26n are reset.

The level shifter 38 is comprised of a CMOS inverter 54, the input of which is coupled to a node 56 and the output of which is coupled to PMMU 20, an n-channel transistor 58 which sinks current from node 56 in response to the ENABLE signal, and a pair of n-channel transistors 60 and 62 which source current to node 56 at a rate dependent upon the voltage on node 42. As in the sense amplifier 36, transistor 60 operates in the depletion mode to source a trickle current to the node 56 while transistor 62 sources current to the node 56 at a rate substantially proportional to the voltage on node 42. By sizing transistors 60 and 58/62 the same as transistors 44 and 46, respectively, the inverter 54 will shift the level on node 42 to normal logic levels. Thus, inverter 54 will provide the LOCK WARNING signal only when less than two (2) of the lock bits 26a-26n are reset or, viewed from another perspective, when all but one (1) of the lock bits 26a-26n are set.

In response to the LOCK WARNING signal, PMMU 20 can set an appropriate status indicator or otherwise signal the processor 12 that the translator cache 22 is in danger of being filled with locked translators. In the preferred form, the LOCK WARNING signal will inhibit the setting of the lock bit 26x of the remaining unlocked storage location 24x, so that the PMMU 20 is assured of having at least one storage location in the translator cache 22 in which to enter new translators. Thus, although performance will be degraded, at least the system 10 is able to continue operation until the processor 12 is able to resolve the problem.

Once a particular page is no longer needed, the processor 12 can instruct the PMMU 20 to "flush" the corresponding translator from the translator cache 22. In response, the PMMU 20 will set an indicator that the particular storage location 24x containing this translator is no longer valid, or at least is a candidate for replacement. If the associated lock bit 26x is set, the PMMU 20 will also need to reset this lock bit 26x. In other words, those storage locations 24a-24n which are locked can only be unlocked at the specific direction of the processor 12, but at least one (1) of the storage locations 24a-24n is always unlocked.

Although the lock warning mechanism has been disclosed herein as being triggered whenever all but one (1) of the storage locations 24a-24n have the associated lock bits 26a-26n set, the embodiment shown in the FIGURE can be modified so that the LOCK WARNING signal is provided whenever all but a selected number of the storage locations 24a-24n have the associated lock bits 26a-26n set. Similarly, the PMMU 20 can respond to the LOCK WARNING signal in other ways without departing from the spirit and scope of the present invention.

We claim:
1. In a cache comprising:
   a plurality of storage locations for storing operands, each storage location having an associated lock indicator adapted to be selectively set and reset; and
   control means for storing an operand in a selected one of said storage locations only if the associated lock indicator is reset, the control means setting said lock indicator in response to a lock signal associated with said stored operand, and resetting the lock indicator of said one storage location in response to a signal indicating that said one storage location is to be unlocked;
the improvement comprising:
   lock warning means, coupled to the lock indicators of all of the storage locations, for providing a lock warning signal when all but a predetermined number of the lock indicators is set.

2. In the cache of claim 1 wherein the control means are inhibited by said lock warning signal from setting the lock indicator associated with said one storage location even if the operand being stored therein has said lock signal associated therewith.

3. In a cache comprising:
   a plurality of storage locations for storing operands, each storage location having an associated lock indicator adapted to be selectively set and reset; and control means for storing an operand in a selected one of said storage locations only if the associated lock indicator is reset, the control means setting said lock indicator in response to a lock signal associated with said stored operand, and resetting the lock indicator of said one storage location in response to a signal indicating that said one storage location is to be unlocked;

a method comprising the step of:

providing a lock warning signal when all but a predetermined number of the lock indicators is set.

4. The method of claim 3 further including the step of inhibiting, in response to said lock warning signal, the control means from setting the lock indicator associated with said one storage location even if the operand being stored therein has said lock signal associated therewith.

* * * * *